(12) United States Patent
Subramanian (10) Patent No.: US 11,496,330 B2
(45) Date of Patent: Nov. 8, 2022

(54) VIDEO PLAYOUT INTEGRATED WITH VIDEO CONFERENCING FOR A GROUP-WATCH VIDEO SYSTEM

(71) Applicant: M/S. Amagi Media Labs Pvt. Ltd., Bangalore (IN)

(72) Inventor: Baskar Subramanian, Bangalore (IN)

(73) Assignee: M/S. Amagi Media Labs Pvt. Ltd, Bangalore (IN)

( * ) Notice: Subject to any disclaimer, the term of this patent is extended or adjusted under 35 U.S.C. 154(b) by 0 days.

(21) Appl. No.: 17/133,697

(22) Filed: Dec. 24, 2020

(65) Prior Publication Data

US 2022/0150082 A1 May 12, 2022

(51) Int. Cl.
*H04L 12/18* (2006.01)
*H04L 65/403* (2022.01)
*H04L 65/612* (2022.01)

(52) U.S. Cl.
CPC ...... *H04L 12/1818* (2013.01); *H04L 12/1831* (2013.01); *H04L 65/403* (2013.01); *H04L 65/612* (2022.05)

(58) Field of Classification Search
None
See application file for complete search history.

(56) References Cited

U.S. PATENT DOCUMENTS

| | | | | |
|---|---|---|---|---|
| 7,145,898 B1* | 12/2006 | Elliott | ..................... | H04L 12/66 370/352 |
| 9,699,409 B1* | 7/2017 | Reshef | ................... | H04N 7/147 |
| 9,736,429 B1* | 8/2017 | Huang | ................... | H04L 65/105 |
| 10,116,596 B2* | 10/2018 | Li | ......................... | H04L 12/1813 |
| 2004/0034723 A1* | 2/2004 | Giroti | ..................... | H04L 12/66 710/8 |
| 2007/0116224 A1* | 5/2007 | Burke | .................. | H04L 65/1083 379/201.12 |
| 2008/0046929 A1* | 2/2008 | Cho | ...................... | H04N 21/462 725/46 |
| 2008/0275955 A1* | 11/2008 | Yamazaki | ............... | H04L 67/24 709/205 |
| 2012/0150956 A1* | 6/2012 | Tucker | ................. | H04L 12/1818 709/204 |
| 2012/0284516 A1* | 11/2012 | Errico | .................... | G16H 80/00 713/168 |
| 2014/0082100 A1* | 3/2014 | Sammon | .............. | G06Q 10/109 709/206 |
| 2014/0267577 A1* | 9/2014 | Weber | .................. | H04L 12/1822 348/14.09 |
| 2015/0249747 A1* | 9/2015 | Boss | ................. | H04M 3/42221 379/85 |
| 2017/0193457 A1* | 7/2017 | Shukla | .................. | H04L 51/046 |
| 2018/0012192 A1* | 1/2018 | Rosenberg | ............ | H04L 65/403 |
| 2018/0181920 A1* | 6/2018 | Min | ..................... | G06F 3/0483 |
| 2019/0014372 A1* | 1/2019 | Kandagal | ......... | H04N 21/42222 |
| 2019/0020678 A1* | 1/2019 | Reddy | .................. | H04L 9/3297 |
| 2019/0073640 A1* | 3/2019 | Udezue | .............. | H04L 12/1818 |

(Continued)

*Primary Examiner* — Scott B Christensen (74) *Attorney, Agent, or Firm* — Laurence P. Colton; Smith Tempel Blaha LLC (57) ABSTRACT

A system, method and computer program product for group consumption of video content streamed through video conferencing systems is proposed, leveraging existing video conferencing and cloud playout systems to build a unique group watching video capability that is scalable and easy to set up for end-consumers.

10 Claims, 4 Drawing Sheets

(56) References Cited

U.S. PATENT DOCUMENTS

2019/0268387 A1\* 8/2019 Pelton ................ H04L 12/1822
2020/0252442 A1\* 8/2020 Brown .................... H04L 51/02
2021/0211609 A1\* 7/2021 Brown .................... H04L 67/02

\* cited by examiner

VIDEO PLAYOUT INTEGRATED WITH VIDEO CONFERENCING FOR A GROUP-WATCH VIDEO SYSTEM

CROSS REFERENCE TO RELATED APPLICATIONS

This patent application claims the benefit of and priority on India Patent Application No. 202041048699 having a filing date of 7 Nov. 2020.

BACKGROUND OF THE INVENTION

Technical Field

The present invention relates to a video playout system and more particularly it relates to a video playout integrated with video conferencing for a group-watch video system.

Prior Art

There are multiple settings where group watching is a needed social experience. Television (TV) content viewing, teaching/training and in enterprise corporate communications; there is a need for a professional live and file-based video streaming to an integrated to a social group watching experience.

TV watching has always been a social experience with friends and family in a living room environment on a large TV screen. With the advent of streaming over-the-top (OTT) based content consumption, content viewing behavior has been moving towards an isolated viewing behavior.

With the advent of connected TV in the living rooms and the advent of social network platforms providing live video streaming options; viewers are starting to enjoy social TV viewing experiences.

With connect TV streaming content at home, social viewing is limited to the physical presence of people in the same location. With social network video streaming, the group of people one co-watches with is uncontrolled and is as large as the content source's friends/followers' network.

Multiple OTT platforms are tackling this social TV experience needs by building proprietary apps on their OTT clients and servers. The limitation of this approach is the need for all viewers to be subscribers to the same OTT platform and have access to the devices on which this experience is implemented.

This viewing experience through video conferencing is relevant in Education and Enterprise corporate training and communications.

Today teachers and trainers use vanilla video conferencing, which provides primitive presentation tools with limited aids. Else they are forced to use custom video production capabilities, which limit broader group interactions.

To solve the limitations of the above approaches, this invention leverages the already popular and existing user behaviour of video conferencing, to bring the content to user's video conferencing sessions.

Group watching TV content can now be more broad-based without limitations of location, device or specific platform needs.

Teachers/trainers will be able to create compelling live classes with a sophisticated video playout system connecting multiple camera sources, graphics and other aids, and be able to connect the same with video conferencing systems when interacting with their students.

By bringing a video streaming client as an additional user in a video conferencing session, user and their select group of viewers can experience video content on their familiar interface on any device and anywhere on a common video conferencing service.

BRIEF SUMMARY OF THE INVENTION

System and method are described to create a group watching experience for both library and live-based video content streamed through existing video conferencing systems.

The system consists for i) a registration system for selecting the content of interest and ii) cloud-instantiated video-conferencing client simulator that streams the selected video to the video conferencing session that it has been invited to participate in.

DETAILED DESCRIPTION OF THE PREFERRED EMBODIMENTS

The objects, features and advantages of the present invention will be further apparent from the following description taken in conjunction with the several figures of the accompanying drawings.

Reference will now be made in detail to the present preferred embodiments of the invention, examples of which are illustrated in the accompanying drawings in which like reference characters refer to corresponding elements.

Figure 1:
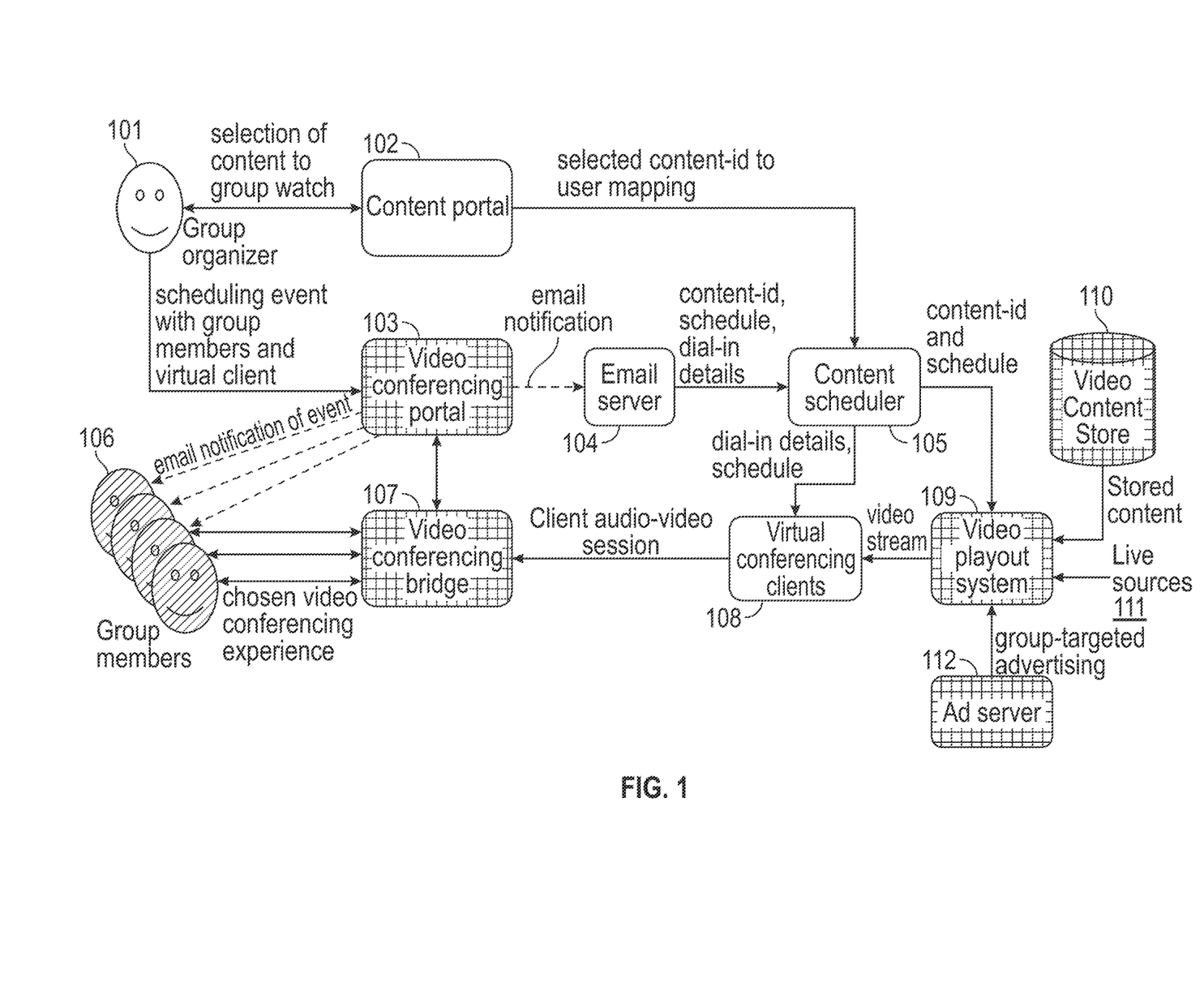
FIG. 1 illustrates a system diagram of the group-watch video streaming integrated with video-conferencing systems.

FIG. 1 describes the system diagram of the group-watch video streaming integrated with video-conferencing systems.

A Group organizer 101 is expected to start the process. The person would be presented a Content portal 102. The portal has access to existing content and/or schedules for live linear content, which the user would like to jointly watch with a select set of Group members 106. The portal is expected to be a secure and authenticated content access, with or without commercial payment options; complying with the business model of the system. The Content portal 102 send the details of the selected content and the user details to a back-end Content scheduler 105.

Group organizer 101 selects a content or schedule of a content when a live linear programming that he/she prefers to group watch. The organizer schedules an appointment viewing time on the Video conferencing portal 103. Along with the select Group members 106, the organizer 101 shall also register the content-specific email addresses provided by the Content portal 102.

It is envisioned that there shall be a plurality of email addresses to support multiple video playout connections in multiple situations. As examples, the video streams might represent different camera positions in a sports match; deeper statistics video, map layout in e-sports gaming matches, supplementary information in teaching videos.

An Email server 104 at the backend receives the content-specific email addresses and provides the dial-in details to a Content scheduler 105. Specific email addresses represent the virtual clients that are expected to serve the content to the group.

At the time of appointment, Group members 106 dial-in onto the Video conferencing bridge 107. Prior to the appointment time, the Content scheduler 105, triggers plurality of Virtual conferencing clients 108 and Video playout systems 109 to be activated.

At the appointed time the Virtual conferencing clients 108 dials into the Video conferencing bridge with the dial-in details provided by the Content scheduler 105.

At the appointed time, the Video playout systems 109 start to playout the video stream, which is streamed onto the Virtual conferencing clients 108 for it to send to the Video conferencing bridge 107.

The Video conferencing portal 103 and the associated Video conferencing bridge 107 are assumed to be any publicly available and accessible system.

Depending on the instructions from the Content scheduler 105, the Video playout systems 109 shall playout either file-based content from a Video content store 110 or enable Live sources 111 to be played out as live linear video streams. It is expected that based on the business model adopted, the Video playout systems 109 shall support group-targeted advertising to be added to the video streams from an Ad server 112.

The specific Video playout systems 109, Video content store 110, Live sources 111 and Ad server 112 are expected to be standard components from where a video stream source is integrated onto Virtual conferencing clients 108.

Figure 2:
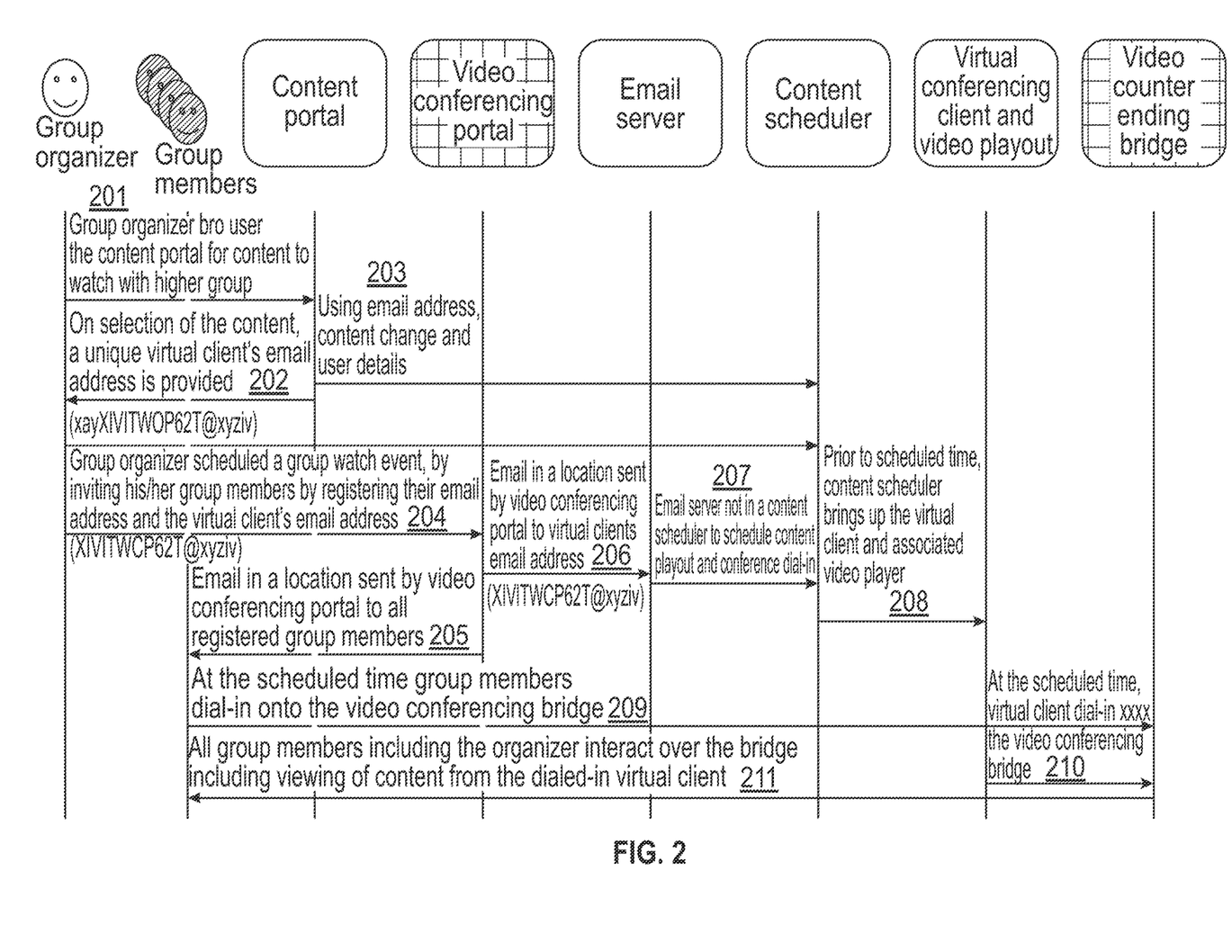
FIG. 2 depicts a messaging chart across system components.

FIG. 2 shows the Group organizer 101 browses the content portal for the content to watch 201. On selection of the content the Content portal 102 generates a unique universally unique identifier (UUID) as the virtual client's email address (say 'X1V17WQP63T@xyz.tv') and provides the same 202 to the Group organizer 101. It is expected in scenarios in which multiple video feeds are expected to be played out, equivalent number of UUID email addresses are generated.

The Content portal 102 sends the UUID and user details 203 back to a Content scheduler 105 that is responsible for scheduling content to be viewed by the group.

Group organizer 101 then schedules a group watch event 204 on any of the Video conferencing portal 103, along with the details of the Group members 106 and the Content portal 102 provided email addresses (say 'X1V17WQP63T@xyz.tv').

The Video conferencing portal 103, in response the schedule reservation, sends invites as email notifications 205 to all registered Group members 106.

In addition to the Group members 106, the Video conferencing portal 103 also sends email notification 206 with the schedule details to virtual client's email address (say 'X1V17WQP63T@xyz.tv') as well. This is received by the custom Email server 104 that represents all virtual clients at the backend.

Email server 104 extracts the UUID (say X1V17WQP63T), schedule of the event, dial-in details and notifies 207 the Content scheduler 105 for managing schedule of this content playout to the specific dial-in conference bridge.

Prior to the schedule of the event, Content scheduler 105 initiates 208, the Virtual conferencing clients 108 and its associated Video playouts 109 components to be activated and be ready for connecting to the conference bridge.

At the scheduled time, Group members 106 dial-in 209 onto the specified Video conferencing bridge 107. The Virtual conferencing clients 108 also dials-in 210 at the scheduled time as yet another guest on the Video conferencing bridge 107. The Video conferencing clients 108 starts streaming the content from the Video playouts 109 onto the bridge.

The Video conferencing bridge 107 re-transmits the content and all other group member interactions 211 to all Group members 106 thus, creating a group watching and interactive experience for all members in the group.

There is no assumption on the Video conferencing platform, except for the fact that the conferencing bridge can be connected to from a web browser interface and supports broadcast of camera input and microphone audio from guest dial-in clients.

Figure 3:
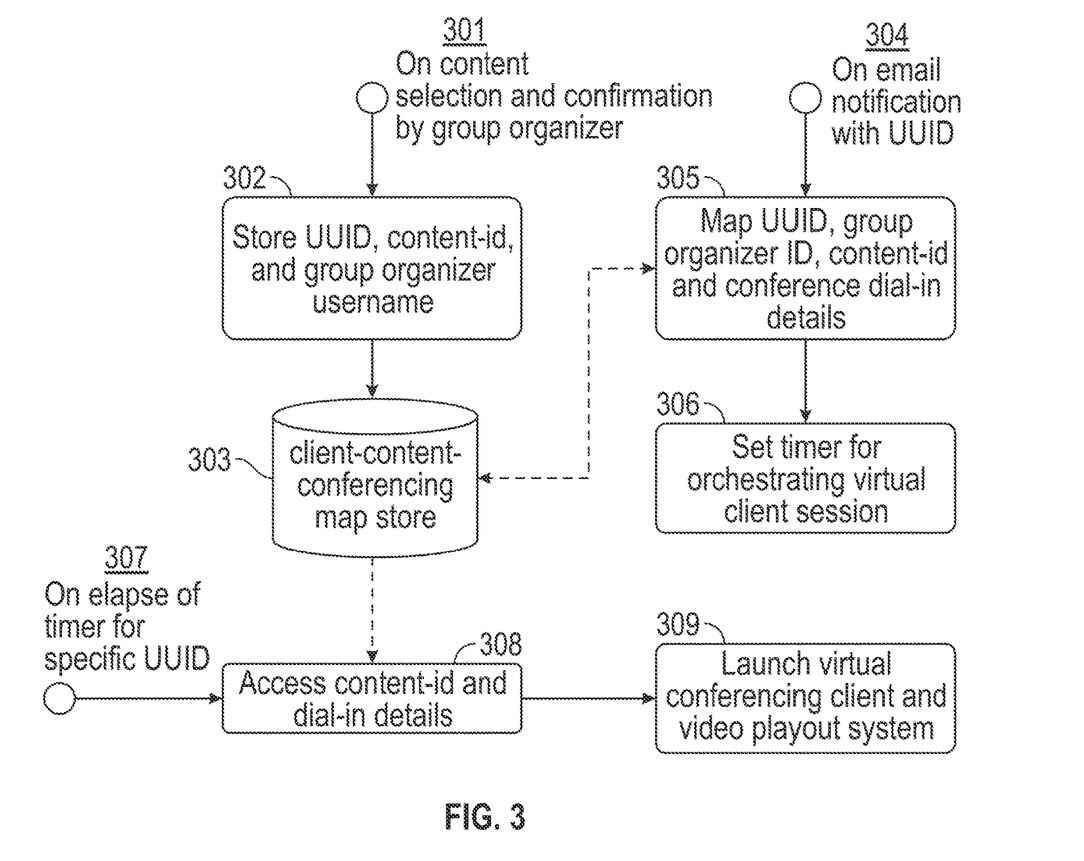
FIG. 3 illustrates a flow diagram of content scheduler module.

Content scheduler 105 is the key control module that drives the orchestration of the system at the backend.

FIG. 3 describes the control flow of this module. There are 3 triggers that drive the Content scheduler module.

1. 301, when the selection of content is done on the Content portal, Content scheduler is intimated with the user and the content selection details. These details are stored into a client-content-conferencing map store 303. The specific details extracted are UUID, content-id and group organizer's username 302.
2. 304, when Email server intimates the arrival of a specific schedule of event. This module extracts the UUID from the email address, maps the group organizer ID to the stored username and the conference dial-in details 305. These are stored into the client-content-conferencing map store 303. This trigger also sets a timer for orchestrating bring-up of Virtual conferencing client and Video player sessions prior to the conference schedule 306.
3. 307, on elapse of timer for the UUID, the module accesses 308 the content-id and the dial-in details from the client-content-conferencing map store 303. This information is then used to bring-up 309 the Virtual conferencing client and the Video playout system.

Figure 4:
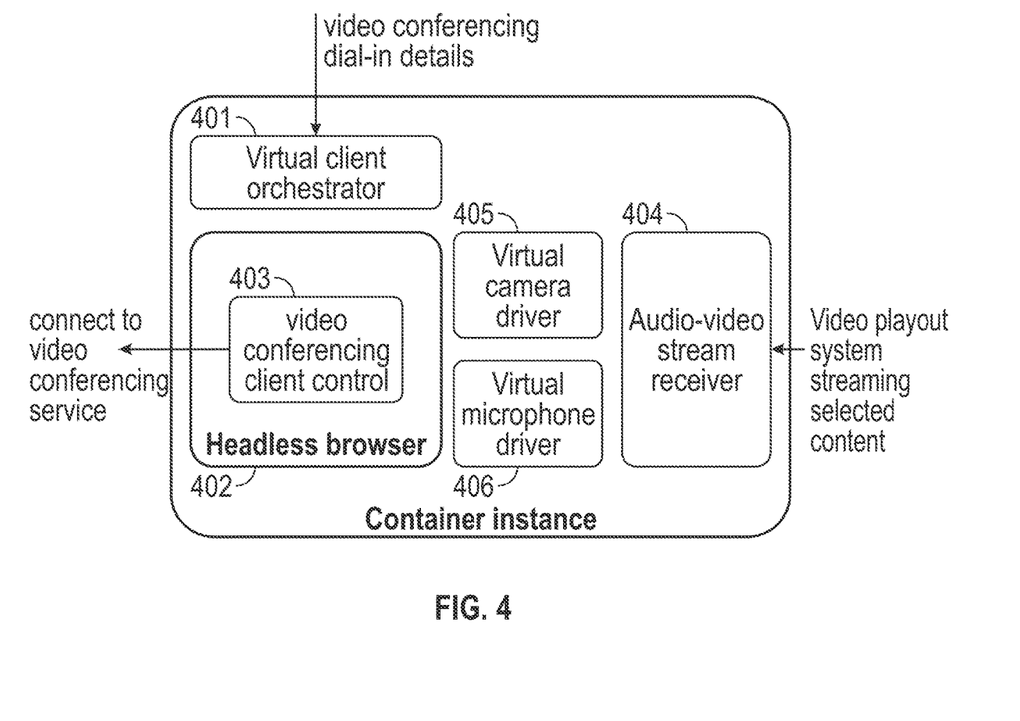
FIG. 4 illustrates virtual conferencing client module—connecting content playout with video conferencing service.

FIG. 4 describes the Virtual conferencing client module that forms the core capability for connecting video playout to the Video conferencing bridge.

Content scheduler 105 launches the Virtual conferencing client by providing the dial-in details. The virtual client orchestrator 401 launches a headless browser 402 instance and initiates the video conferencing client control 403 on the browser. The browser client now connects to the Video conferencing bridge and becomes yet another guest in the conference.

The headless browser's camera and microphone interfaces are replaced with virtual camera driver 405 and virtual microphone driver 406, which in turn connect to an Audio-video stream receiver module 404. The Audio-video stream receiver 404 receives the audio-video stream from Video playout system and splits the video to be served to the virtual camera driver 405 and the audio to the microphone interface 406.

With this interface, the Virtual conferencing client is streaming the Video playout system content as its audio and video onto the conferencing bridge.

This invention leverages existing video conferencing system and cloud video playout systems to build a unique group watching video capability that is scalable and easy to setup for end-consumers.

The focus on simple interface for consumers and the ability to connect to any of the existing video conferencing platforms, make this a unique group watching video system.

The video playout system could in itself be any of a file playout, live stream playout or a complete live production system whose output is streamed to the Virtual conferencing client. This opens up multiple use-cases in entertainment, education and enterprise training and communication needs, where interactive video conferencing capabilities are seamlessly blended with sophisticated video playout and production systems.

Various inventive Aspects According To Principles and Concepts of the Present Disclosure:

1. A scalable system for group consumption of video content streamed through video conferencing systems having (a) a group organizer 101 to initiate the process (b) a content portal 102 to show the organizer the content choices available to the group (c) a Video conferencing portal 103 with which the organizer schedules a viewing time (d) one or more group members 106 that partake in the consumption of video content (e) a video conferencing bridge 107, (f) an email server 104, (g) a video content store 110, (h) one or more live sources 111, and (i) an ad server 112, wherein:
   a) a content scheduler 105 receives details of the content selected by the group organizer 101 from the content portal 102 and a content-specific IDs (UUID) from the email server 104, to which the content scheduler provides dial-in details;
   b) video playout systems 109 that play out video streams to a virtual conferencing clients 108; and
   c) the virtual conferencing clients 108 that receives video streams from a video playout systems and sends them to the video conferencing bridge 107.

2. The system of claim 1, wherein the group organizer 101 browses the content portal 201, upon selection of content the content portal 102 generates a UUID and provides the same to the group organizer, the content portal 102 sends the UUID and user details 203 back to the content scheduler 105 that is responsible for scheduling content to be consumed by the group, the group organizer 101 subsequently schedules a group event 204 on the video conferencing portal 103 along with the details of the group members 106 and the UUID email addresses generated by the content portal 102, the video conferencing portal 103 responds to a schedule reservation by sending invites as email notifications 205 to all the registered group members 106 wherein the UUID email addresses are now considered one of the group members, which is received by the email server 104 representing all virtual clients at the backend wherein the email server 104 extracts the UUID, the schedule and dial-in details and notifies 207 the content scheduler 105 to manage the schedule of this content playout to the specific dial-in conference bridge such that at the scheduled time the group members 106 dial-in 209 onto the specified video conferencing bridge 107 with the video conferencing clients 108 also dialing in 210 at the scheduled time as yet another guest, the video conferencing clients 108 starts streaming content from the video playouts 109 onto the bridge, the video conferencing bridge 107 re-transmits the content and all other group member interactions 211 to all group members 106 wherein prior to the scheduling of the event, the content scheduler 105 brings up 208 virtual conferencing clients 108 and one or more video playout 109 components.

3. The system of claim 1, wherein the content scheduler 105 is triggered by:
   a) a selection of content is made on the content portal 301;
   b) an intimation by the email server of the arrival of a specific schedule of event 304; and
   c) a lapsation of a timer for the UUID 307.

4. The system of claim 3, wherein the content scheduler 105 upon being triggered by a selection of content on the content portal 301, said details being stored into a client-conferencing map store 303, extracts details about the client including the UUID, content-ID and group organizer's user name 302.

5. The system of claim 3, wherein the content scheduler 105 upon being triggered by an intimation by the email server of the arrival of a specific schedule of event 304, extracts the UUID from the email address, maps the group organizer's ID to the stored username and the conference dial-in details 305 to be stored in the client content conferencing map store 303, setting a time for orchestrating the initiation of the virtual conferencing clients and the video playout systems.

6. The system of claim 3, wherein the content scheduler 105 upon being triggered by a lapsation of a timer for the UUID 307 accesses the content-ID and the dial-in details from the client-content conferencing map store 303 and using this information to bring up the virtual conferencing clients and the video playout systems 309.

7. The system of claim 1, wherein the virtual conferencing client 108 further comprises:
   a) a virtual client orchestrator 401 which launches a headless browser 402 instance and initiates a video conferencing client control 403 on the browser, which connects to the video conferencing bridge 107 as a guest in the group consumption conference;
   b) a virtual camera driver 405 replacing the headless browser's camera;
   c) a virtual microphone driver 406 replacing the headless browser's microphone; and
   d) an audio-video stream receiver 404 which receives the audio-video stream from the video playout system and splits the video to be served to the virtual camera driver 405 and the audio to the microphone interface 406.

8. The system of claim 1, wherein the content-specific ID is an email address.

9. A computer-implemented method comprising:
   a) selecting content further comprising the steps of:
      i) browsing a content portal 102 for content to watch 201 by a group organizer 101;
      ii) generation of a UUID by the content portal 102 and sending the same 202 to the group organizer 101;
      iii) sending the UUID and user details 203 back to a content scheduler 105 that is responsible for scheduling content to be consumed by the group;
      iv) bringing up 208 the virtual conferencing client 108 and its associated video playout 109 components to be activated in readiness for connecting to the conference bridge;
   b) scheduling a group event 204 by the group organizer 101 on any of the video conferencing portal 103 along with details of one or more group members 106 and the UUID further comprising the steps of:
      i) sending invitations as email notifications 205 to all the group members 106 by the video conferencing portal 103 in response to the scheduling;
      ii) sending invitations as email notifications 206 to the UUID;
      iii) receiving the email sent in step 'ii' by a custom email server 104 that represents all virtual clients at the backend;

iv) extracting the UUID, schedule, dial-in details by the email server 104 and notifying 207 the content scheduler 105 for managing the schedule to playout the selected content on a specific dial-in conference bridge;

c) viewing the content further comprising the steps of:
  i) dialing in 209 to the video conferencing bridge 107 by the group members 106 wherein the video conferencing client 108 also dials in 210 as yet another guest;
  ii) streaming the content from the video playout 109 onto the bridge by the video conferencing client 108; and
  iii) re-transmitting the content and all other interactions between group members 211 by the video conferencing bridge 107, creating a group consumption experience that is interactive for all group members 106.

10. A non-transitory, machine-readable storage medium having stored thereon a computer program for group consumption of video content, the computer program comprising a set of instructions for causing a machine to perform the steps of:
  a) selecting content further comprising the steps of:
    i) browsing a content portal 102 for content to watch 201 by a group organizer 101;
    ii) generation of a UUID by the content portal 102 and sending the same 202 to the group organizer 101;
    iii) sending the UUID and user details 203 back to a content scheduler 105 that is responsible for scheduling content to be consumed by the group;
    iv) bringing up 208 the virtual conferencing client 108 and its associated video playout 109 components to be activated in readiness for connecting to the conference bridge;
  b) scheduling a group event 204 by the group organizer 101 on any of the video conferencing portal 103 along with details of one or more group members 106 and the UUID further comprising the steps of:
    i) sending invitations as email notifications 205 to all the group members 106 by the video conferencing portal 103 in response to the scheduling;
    ii) sending invitations as email notifications 206 to the UUID;
    iii) receiving the email sent in step 'ii' by a custom email server 104 that represents all virtual clients at the backend;
    iv) extracting the UUID, schedule, dial-in details by the email server 104 and notifying 207 the content scheduler 105 for managing the schedule to playout the selected content on a specific dial-in conference bridge;
  c) viewing the content further comprising the steps of:
    i) dialing in 209 to the video conferencing bridge 107 by the group members 106 wherein the video conferencing clients 108 also dials in 210 as yet another guest;
    ii) streaming the content from the video playout 109 onto the bridge by the video conferencing clients 108; and
    iii) re-transmitting the content and all other interactions between group members 211 by the video conferencing bridge 107, creating a group consumption experience that is interactive for all group members 106.

11. A scalable computer program product, the computer program product including (a) a group organizer 101 to initiate the process (b) a content portal 102 to show the organizer the content choices available to the group (c) a Video conferencing portal 103 with which the organizer schedules a viewing time (d) one or more group members 106 that partake in the consumption of video content (e) a video conferencing bridge 107, (f) an email server 104, (g) a video content store 110, (h) one or more live sources 111, and (i) an ad server 112, wherein:
  a) a content scheduler 105 receives details of the content selected by the group organizer 101 from the content portal 102 and a content-specific ID (UUID) from the email server 104, to which the content scheduler provides dial-in details;
  b) a video playout system 109 that plays out video streams to a virtual conferencing client 108: and
  c) the virtual conferencing client 108 that receives video streams from a video playout system and sends them to the video conferencing bridge 107.

12. The computer program product of claim 11, wherein the group organizer 101 browses the content portal 201, upon selection of content the content portal 102 generates a UUID and provides the same to the group organizer, the content portal 102 sends the UUID and user details 203 back to the content scheduler 105 that is responsible for scheduling content to be consumed by the group, the group organizer 101 subsequently schedules a group event 204 on the video conferencing portal 103 along with the details of the group members 106 and the UUID generated by the content portal 102, the video conferencing portal 103 responds to a schedule reservation by sending invites as email notifications 205 to all the registered group members 106 wherein the UUID is now considered one of the group members, which is received by the email server 104 representing all virtual clients at the backend wherein the email server 104 extracts the UUID, the schedule and dial-in details and notifies 207 the content scheduler 105 to manage the schedule of this content playout to the specific dial-in conference bridge such that at the scheduled time the group members 106 dial-in 209 onto the specified video conferencing bridge 107 with the video conferencing client 108 also dialing in 210 at the scheduled time as yet another guest, the video conferencing client 108 starts streaming content from the video playout 109 onto the bridge, the video conferencing bridge 107 re-transmits the content and all other group member interactions 211 to all group members 106 wherein prior to the scheduling of the vent, the content scheduler 105 brings up 208 the virtual conferencing client 108 and one or more video playout 109 components.

13. The computer program product of claim 11, wherein the content scheduler 105 is triggered by:
  a) a selection of content is made on the content portal 301;
  b) an intimation by the email server of the arrival of a specific schedule of event 304; and
  c) a lapsation of a timer for the UUID 307.

14. The computer program product of claim 11, wherein the content scheduler 105 upon being triggered by a selection of content on the content portal 301, said details being stored into a client-conferencing map store 303, extracts details about the client including the UUID, content-ID and group organizer's user name 302.

15. The computer program product of claim 11, wherein the content scheduler 105 upon being triggered by an intimation by the email server of the arrival of a specific schedule of event 304, extracts the UUID from the email address, maps the group organizer's ID to the stored username and the conference dial-in details 305 to be stored in the client content conferencing map store 303, setting a timer for orchestrating the initiation of the virtual conferencing client and the video playout system.

16. The computer program product of claim 11, wherein the content scheduler 105 upon being triggered by a lapsation of a timer for the UUID 307 accesses the content-ID and the dial-in details from the client-content conferencing map store 303 and using this information to bring up the virtual conferencing client and the video playout systems 309.

17. The computer program product of claim 11, wherein the virtual conferencing client 108 further comprises:
 a) a virtual client orchestrator 401 which launches a headless browser 402 instance and initiates a video conferencing client control 403 on the browser, which connects to the video conferencing bridge 107 as a guest in the group consumption conference;
 b) a virtual camera driver 405 replacing the headless browser's camera;
 c) a virtual microphone driver 406 replacing the headless browser's microphone; and
 d) an audio-video stream receiver 404 which receives the audio-video stream from the video playout system and splits the video to be served to the virtual camera driver 405 and the audio to the microphone interface 406.

18. The computer program product of claim 11, wherein the content-specific ID is an email address.

What is claimed is:

1. A scalable system for group consumption of video content to be streamed through a video conferencing system in which a group organizer schedules a video conferencing session via a video conferencing portal of the video conferencing system for streaming content to one or more members of a group and to a virtual conferencing client from at least one of a video content store, one or more live sources and an ad server, the scalable system comprising:
 a content portal configured to generate a content identifier (ID) and a first virtual conferencing client ID in response to a content selection made by the group organizer via the content portal, the first virtual conferencing client ID identifying a first virtual conferencing client that will participate in the video conferencing session out of a plurality of virtual conferencing clients, each virtual conferencing client of said plurality of virtual conferencing clients being identified by a respective virtual conferencing client ID, and wherein the virtual conferencing clients are non-human and are not associated with any human user of the video conferencing system;
 a content scheduler configured to:
 receive, from the content portal, the content ID;
 receive, from an email server, an email address associated with said first virtual conferencing client ID, an event schedule and dial-in details for the video conferencing session;
 schedule an event for streaming the content selected by the group organizer to the members of the group and to said first virtual conferencing client;
 interact with said first virtual conferencing client at an appointment time indicated in the event schedule to cause said at least a first virtual conferencing client to participate in the video conferencing session via a video conferencing bridge of the video conferencing system;
 video playout systems configured to be orchestrated by the conference scheduler at the appointment time to play out a first audio-video streams comprising the selected content to the first virtual conferencing client; and said first virtual conferencing client being configured to receive the first audio-video stream played out by the video playout systems and to send the received first audio-video stream to the video conferencing bridge of the video conferencing system such that the members of the group participating in the video conferencing session can consume the first audio-video stream within the video conferencing session.

2. The system of claim 1, wherein the first virtual conferencing client uses the dial-in details to dial into the video conferencing bridge at the appointment time and to start streaming the first audio-video streams received from the video playout systems onto the video conferencing bridge such that the video conferencing bridge re-transmits the first audio-video streams to all group members participating in the video conferencing session.

3. The system of claim 1, wherein the content scheduler is triggered by any of:
 said content selection;
 an intimation by the email server of the arrival of the event schedule;
 and a lapsation of a timer that is set to coincide with the appointment time.

4. The system of claim 3, wherein the first virtual conferencing client ID is a first universally unique ID (UUID) extracted from the email address associated with the first virtual conferencing client ID, and wherein the content scheduler, upon being triggered by said content selection, stores details about the event in a client-conferencing map store including the first UUID, the content ID and a user name of the group organizer.

5. The system of claim 3, wherein the first virtual conferencing client ID is a first universally unique ID (UUID) extracted from the email address associated with the first virtual conferencing client ID, and wherein the content scheduler, upon being triggered by an intimation by the email server of the arrival of the event schedule, extracts the first UUID from the email address associated with the virtual conferencing client ID, maps a user name ID of the group organizer to a stored username and to the dial-in details, and sets a time for orchestrating initiation of the first virtual conferencing client and of the video playout systems.

6. The system of claim 3, wherein the content scheduler, upon being triggered by lapsation of the timer, accesses the content ID and the dial-in details from a client-content conferencing map store and uses the content ID and the dial-in details to bring up the first virtual conferencing client and the video playout systems.

7. The system of claim 1, wherein the first virtual conferencing client further comprises:
 a virtual client orchestrator configured to launch a headless browser instance and to initiate a video conferencing client control on the browser that connects to the video conferencing bridge as a guest in the video conferencing session;
 a virtual camera driver configured to replace a camera of the headless browser;
 a virtual microphone driver configured to replace a microphone of the headless browser; and
 an audio-video stream receiver configured to receive the first audio-video stream from the video playout systems and to split the first audio-video stream into a first video stream to be served to the virtual camera driver and a first audio stream to be served to the virtual microphone driver.

8. The system of claim 1, wherein the content ID comprises an email address.

9. A computer-implemented method for group consumption of video content to be streamed through a video conferencing system in which a group organizer schedules a video conferencing session via a video conferencing portal of the video conferencing system for streaming content to one or more members of a group and to a virtual conferencing client from at least one of a video content store, one or more live sources and an ad server, the method comprising:
- browsing a content portal for content to watch by the group and selecting content to be consumed by the group during the video conferencing session;
- in a content portal, generating a first universally unique identifier (UUID) associated with a first virtual conferencing client out of a plurality of virtual conferencing clients, sending the first UUID to the group organizer, and sending the first UUID, a content ID associated with the selected content and user details to a content scheduler, each virtual conferencing client of said plurality of virtual conferencing clients being identified by a respective UUID, and wherein the virtual conferencing clients are non-human and are not associated with any human user of the video conferencing system;
- in the content scheduler, receiving the first UUID and user details from the content portal and scheduling an event for the selected content to be consumed by the members of the group during the video conferencing session;
- with the content scheduler, at an appointment time of the event, bringing up the first virtual conferencing client and associated video playout components to be activated in readiness for connecting the first virtual conferencing client to a video conferencing bridge of the video conferencing system;
- on a video conferencing portal of the video conferencing system, prior to the appointment time, sending invitations as email notifications to all the group members to participate in the video conferencing session by dialing into to the video conferencing bridge at the appointment time;
- in the content scheduler, at the appointment time, causing the first virtual conferencing client to dial into the video conferencing bridge and causing the selected content to be streamed from the video playout components onto the video conferencing bridge by the first virtual conferencing client; and
- with the video conferencing bridge, re-transmitting the selected content streamed from the video playout components to the group members participating in the video conferencing session.

10. A computer program embodied on a non-transitory computer-readable medium and comprising computer instructions for execution by one or more processors for causing video content to be streamed through a video conferencing system in which a group organizer schedules a video conferencing session via a video conferencing portal of the video conferencing system for streaming content to one or more members of a group and to a virtual conferencing client from at least one of a video content store, one or more live sources and an ad server, the computer program comprising:
- a content portal code segment configured to generate a content identifier (ID) and a first virtual conferencing client ID in response to a content selection made by the group organizer via a content portal, the first virtual conferencing client ID identifying a first virtual conferencing client that will participate in the video conferencing session out of a plurality of virtual conferencing clients, each virtual conferencing client of said plurality of virtual conferencing clients being identified by a respective virtual conferencing client ID, and wherein the virtual conferencing clients are non-human and are not associated with any human user of the video conferencing system;
- a content scheduler code segment configured to:
  - receive, from the content portal, the content ID;
  - receive, from an email server, an email address associated with said first virtual conferencing client ID, an event schedule and dial-in details for the video conferencing session;
  - to schedule an event for streaming the content selected by the group organizer to the members of the group and to said first virtual conferencing client;
  - interact with said first virtual conferencing client at an appointment time indicated in the event schedule to cause the first virtual conferencing client to participate in the video conferencing session via a video conferencing bridge of the video conferencing system;
- a video playout code segment configured to be orchestrated by the conference scheduler at the appointment time to play out a first audio-video streams from video playout systems to said first virtual conferencing client, the first audio-video streams comprising the selected content; and
- a first virtual conferencing client code segment comprising the first virtual conferencing client, the first virtual conferencing client code segment being configured to receive the first audio-video streams being played out by the video playout systems and to send the received first audio-video streams to the video conferencing bridge of the video conferencing system such that the members of the group participating in the video conferencing session can consume the first audio-video streams.

* * * * *